SPEED CHANGER FOR MAGNETIC TAPE RECORDER

Filed Dec. 6, 1957

INVENTORS
CHARLES A. VOGEL
MICHAEL SAWICKI
BY
Eugene S. Lovette
ATTORNEY

United States Patent Office 2,865,632

Patented Dec. 23, 1958

2,865,632

SPEED CHANGER FOR MAGNETIC TAPE RECORDER

Charles A. Vogel, Valley Stream, and Michael Sawicki, Yonkers, N. Y., assignors to Harry Sussman and Stanley Rosenberg, both of Great Neck, N. Y.

Application December 6, 1957, Serial No. 701,186

7 Claims. (Cl. 271—2.3)

This invention relates to magnetic sound recording and reproducing apparatus, and more particularly, to improved structure for changing the speed of a recording tape of magnetic sound recording and reproducing machines.

The width of the frequency band reproduced by magnetic recording machines increases proportionately to the speed of the recording tape of such machines. Often it is desirable to embody dual speed operation in a single magnetic sound recording and reproducing machine. This permits the same machine to be used for general office dictation and transcription as well as the recording of high fidelity information such as musical works and the transcription thereof. For ordinary office work wherein the magnetic recorder will be used to record speech, the relatively lower speed is ordinarily adequate, whereas, the higher speed operation is desirable for the high fidelity musical reproduction. Therefore, in order to adapt the speed of the recording tape to the desired quality of recording, magnetic sound recording and reproducing machines as contemplated herein are equipped with a device for changing the speed of the recording tape. The problem of changing speed of recording tape is generally a difficult one since the smallest variations in speed of the tape are heard when reproducing the recording. In order to avoid this disadvantage, it has been the practice to couple a dual speed transmission to the recorder flywheel and the tape drive. Besides adding to the complexity of the machine, it also requires rating the flywheel multiple speed operation. However, one advantage of the instant invention, among others, is that the speed change structure permits flywheel operation at one specified speed and therefore allows flywheel rating for a single speed.

It is therefore a principal object of the instant invention to provide a mechanically simple and yet extremely reliable and accurate device for changing the speed of recording tape of magnetic sound recording and reproducing devices free of inaccuracies and/or complexities attending speed changing devices of the prior art structures.

It is a further object of the instant invention to provide novel means for changing the speed of recording tape of magnetic sound recording and reproducing machines wherein the flywheel is operated at a single specified speed and therefore may be accurately matched for such single speed and wherein a longitudinally suspended capstan is moved from one to another of two positions along the flywheel shaft in order to alternate respectively the speed of the recording tape from a slow speed to a fast speed.

It is a further object of the instant invention to provide a novel device for changing the speed of a recording tape of magnetic sound recording and reproducing machines wherein speed changing can be effected whether the machine motor is running or not and thus eliminates the problem of stopping the machine motor and wherein speed changing can be effected by simple manual operation by means of longitudinally positioning a capstan sleeve mounted on an exposed extension of the flywheel shaft by gripping the end of said sleeve by one's fingers and moving same upward or downward and thus correspondingly changing the tape speed.

It is a further object of the instant invention to provide a device for changing the speed of recording tape of magnetic sound recording and reproducing machines wherein no additional bearings are required in addition to the journals normally required for the flywheel structure, that is to say, additional journals are not required to support a displaceable capstan sleeve on the flywheel shaft for effecting speed changing in accordance with the instant invention.

It is a further object of the instant invention to employ the shaft of the flywheel as the driving surfaces to effect low speed tape movement, and to employ an enlarged diametered section of the displaceable capstan to effect high speed tape movement, and wherein a high to low speed change may be effected without disengagement of the tape from magnetic pick-up head.

Further objects and advantages will become apparent from the following description of the invention taken in conjunction with the figures, in which.

Figures 1, 2, 3, 4, 5:
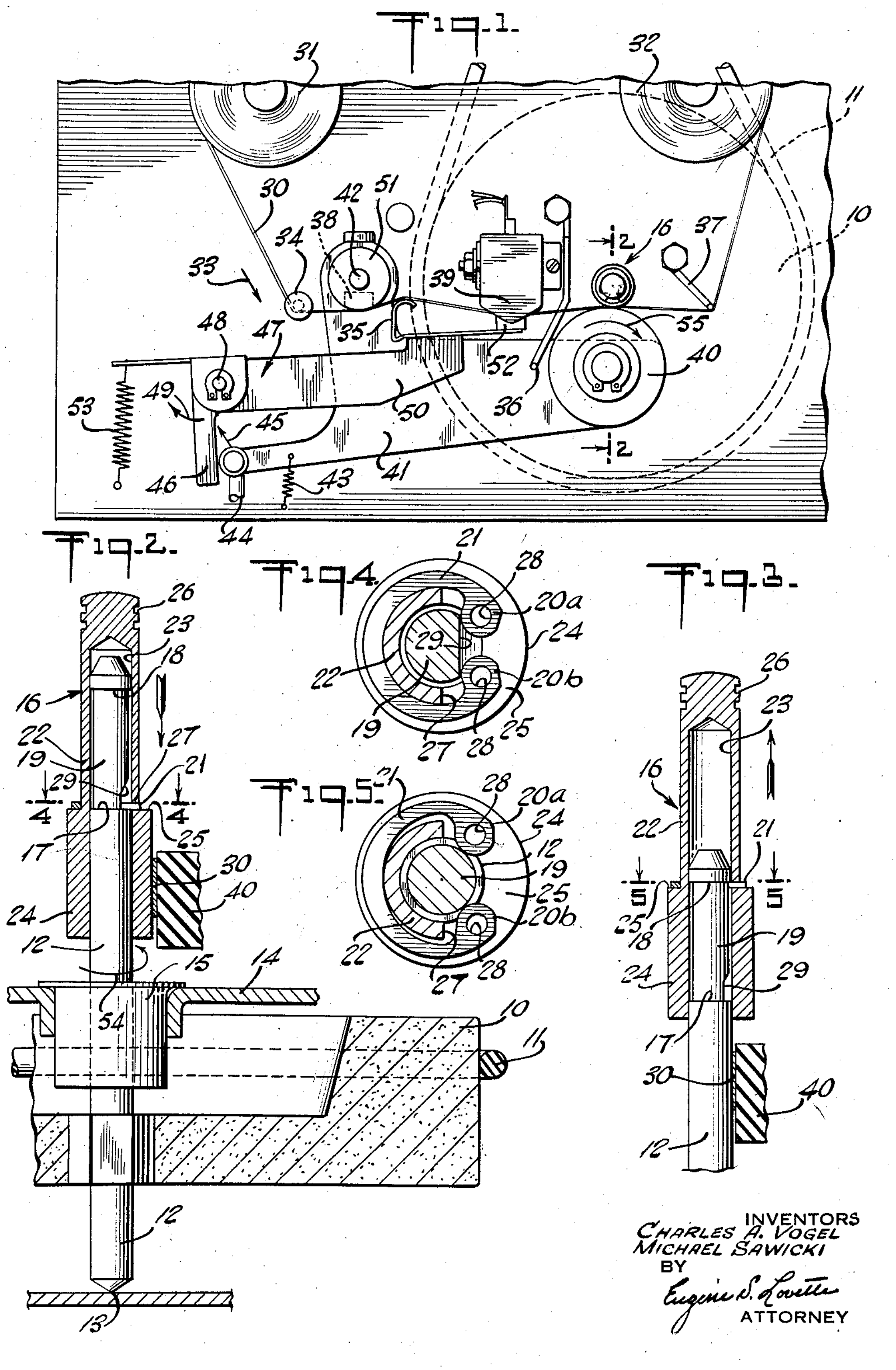
Fig. 1 illustrates a fragmentary plan view of a magnectic sound recorder and reproducing device incorporating an embodiment of the instant invention.
Fig. 2 illustrates a longitudinal, sectional and fragmentary view taken along line 2—2 of Fig. 1 and shows in detail the capstan sleeve mounted on a flywheel shaft in accordance with the practice of the instant invention wherein the capstan sleeve is in its lower position to effect the relatively high speed tape movement.
Fig. 3 is a longitudinal, sectional and fragmentary view of the capstan sleeve now in its upper position in contrast to the lower position shown in Fig. 2; the arrangement shown in Fig. 3 effects the relatively slower speed for magnetic tape movement.
Fig. 4 is a sectional plan view of the capstan structure taken along line 4—4 of Fig. 2.
Fig. 5 is a sectional plan view of the capstan structure taken along line 5—5 of Fig. 3.

Reference is now made to the figures wherein an embodiment of the invention will be described to illustrate its practice.

The magnetic sound recording and reproducing apparatus is provided with well known driving means which includes a flywheel 10 interconnected by suitable means such as a belt 11 to a motor (not shown herein) for driven rotation. It will be understood that flywheel 10 is designed to turn at substantially one specified R. P. M. which is one advantage provided by the instant invention. Flywheel 10 is mounted to turn integrally with its vertically suspended shaft 12, which shaft is journalled in a fixed bearing at its lower end conventionally represented at 13. It may be assumed that bearing 13 is an integral extension of a chassis structure of the recording apparatus. Flywheel shaft 12 extends vertically and upwardly from a panelboard 14 of the recording apparatus. Where shaft 12 extends through the plane of panelboard 14, a suitable bushing 15 may be housed thereat to serve as the other shaft journal. The aforesaid bearings 13, 15 are the minimum required to hold shaft 12 erect for turning about its axis. One feature of the instant invention is that it does not require additional bearings even though the speed changing structure 16 is carried by such shaft 12.

The upper end of shaft 12 has a predetermined outside diameter and is also provided with opposed spaced apart ledges 17, 18, which ledges define an axial section of undercut outside diameter 19 near its top end. Ledges 17, 18 are shoulder stops serving, as will be seen hereinafter, to engage opposed inwardly turned hooked ends 20a, b of a retaining spring 21. Resilient spring 21 is snapped locked on a sleeve capstan 22. Sleeve capstan 22 is a cylindrical member having a centralized bore 23 extending from its open bottom end substantially its full internal length but may be enclosed at its top end 26, which top end is exposed to be gripped by a person. Capstan 22 is mounted on shaft 12 and, in addition, the top end of sleeve capstan 22 may be grooved or otherwise knurled at 26 to permit finger gripping thereat to raise or lower capstan 22 with respect to shaft 12. The lower end of capstan 22 has an enlarged outer diameter portion 24 of predetermined dimension terminating at its upper end at a ledge 25. A slot 27 is provided in the smaller outer diameter portion of capstan 22 just above ledge 25. Slot 27 extends through the wall of capstan 22.

A substantially circular-shaped resiliently retaining spring 21 is provided with turned in, spaced apart ends 20a, b which spring 21 is snapped over the smaller outer diameter portion of sleeve 22 such that the ends thereof 20a, b project through slot 27 so as to lock spring 21 on sleeve 22 and thus prevent accidental removal of spring 21 from such sleeve. Holes 28 in ends 20a, b are adapted to receive a tool to facilitate insertion and removal of spring 21.

In effect, ends 20a, b are runners designed to engage slidably undercut 19 as capstan 22 is raised and lowered from one to another of its two positions. It will be understood that the sectional views, Figs. 4 and 5, taken along lines 4—4 and 5—5, extend through the upper plane of slot 27. Upon examining these figures, one is able to see that the inner ends of runners 20a, b bear resiliently against the undercut portions of shaft 12. In particular, Fig. 5 shows runners 20a, b engaging undercut outer diameter 19 wherein capstan 22 is in its uppermost position. On the other hand, Fig. 4 shows runners 20a, b engaging a further undercut 29 just above lower shoulder stop 17, which undercut 29 is recessed in undercut 19. Undercut 29 has a sloped portion which comes in gradual register with undercut surface 19. The small undercut 29 serves as a cam surface, the purpose of which will be explained hereinafter.

Accordingly, it will be understood that upon snapping spring 21 on capstan sleeve 22 wherein runners 20a, b register within slot 27, spring 21 remains locked on said capstan and the runners thereof are maintained in slidable engagement against said undercut surfaces by reason of the inwardly force developed by the resilient spring 21. Moreover, it will also be understood that spring 21 remains locked thereon as capstan 22 is raised and lowered from one to the other of its positions. Capstan sleeve 22 may be vertically displaced along shaft 12 from one to another of its two positions as determined by register of the top flat surfaces of runners 20a, b with upper shoulder stop 18 (shown in detail in Fig. 3) and by register of the opposed bottom flat surfaces of runners 20a, b with lower shoulder stop 17 (shown in detail in Fig. 2). Consequently, it will be understood that movement of capstan sleeve 22 is restricted by the axial length of undercut 19, capstan sleeve 22 being in its uppermost position when runners 20a, b bear against upper shoulder stop 18 and being in its lowermost position when runners 20a, b bear against lower shoulder stop 17.

In the illustrated embodiment, magnetic tape 30 is carried by two reels 31, 32. For record and playback operation, tape 30 is driven in the direction of arrow 33. Intermediate said reels 31, 32, tape 30 is supported and guided by a series of guide posts 34, 35, 36 and 37 to maintain tape 30 at suitable height and position with respect to a vertically displaceable erasing magnet 38 and recording and playback head 39. Guide post 36 provides a horizontal support surface which maintains tape 30 a proper height so that it is juxtaposed magnetic head 39 for recording and playback. It will be noted from Fig. 1 that tape 30 is clamped between the speed change structure 16 and an idler roller 40 intermediate guides 36, 37.

Tape 30 is strung between reels 31, 32 in a substantially taut-like manner and is resiliently bowed by the offsetting guide structures including guide 35 and the clamping elements made up of speed change structure 16 and the operationally associated idler 40. For record and playback operation, as shown in Fig. 1, the foregoing structure resiliently bows tape 30 as the moving tape is caused to bear against magnetic head 39. The erasing magnet 38 is embedded in a displaceable cylindrical sleeve 51. Sleeve 51 is made of non-magnetic material and is carried by a vertical shaft 42. When sleeve 51 is in its depressed position to effect record operation, magnet 31 is disposed juxtaposed the moving tape 30 such that tape 30 is first erased by magnet 38 and then available to receive recorded information by the operation of head 39. For playback, the magnet carrying sleeve 51 is raised to its second position whereby magnet 38 rises above tape 30 so as not to erase the recorded information; the lower portion of sleeve 51 now merely serves as a guide for the moving tape 30.

A free rotating idler roller 40 is journalled on a movable member 41, which member 41 is biased to pivot about shaft 42 in a counterclockwise direction as viewed in Fig. 1 by a spring 43 under tension and tied to a convenient portion of the recorded chassis. As noted hereinbefore, shaft 42 also serves to carry cylindrical sleeve 51 in which erasing magnet 38 is embedded to allow vertical displacement of magnet 38 with respect to tape 30. The force of spring 43 operatively urges member 41 to clamp tape 30 between idler 40 and alternately sleeve capstan 22 as shown in Fig. 2 or against shaft 12, as shown in Fig. 3. Upon depressing a suitably located button 44 integral with member 41 in a clockwise direction about shaft 42, member 41 pivots in the clockwise direction shown by arrow 45 against the expanding spring 43 to withdraw idler 40 from its clamping position so as to release tape 30, which tape would otherwise be clamped against capstan sleeve 22 or shaft 12. Upon pivoting of member 41, the rounded rear portion of button 44 comes in operational contact with one arm 46 of a two-arm pivotal lever 47 so as to pivot lever 47 about a shaft 48 in the clockwise direction of arrow 49. The other arm 50 of lever 47 carries a backing brush 52 which is so disposed to hold tape 30 against magnetic head 39 when member 41 occupies the position as depicted in Fig. 1. Lever 47 is biased by a spring 53 to turn in a counterclockwise direction so as to maintain tape 30 against head 39. Arm 50 of lever 47 also carries guide 35; hence, upon depression of button 44 so as to withdraw idler 40 from its clamping position, back brush 52 as well as guide 35 are simultaneously withdrawn from tape 30 and upon release button 44, backing brush 52 and guide 35 return to the position depicted in Fig. 1 under the force of spring 53. Accordingly, it is seen that as member 41 is pivoted from one to another of its two positions, two-arm lever is correspondingly pivoted.

In addition and through suitable means not shown herein simply because it is not believed necessary to illustrate same in order to explain the instant invention, when member 41 is pivoted in direction of arrow 45 against spring 43 to occupy its non-clamping position, both of the aforesaid reels 31, 32 are normally operatively disconnected from the driving motor so as to halt tape movement.

Operation of the speed change structure 16 will be considered now. Assume that capstan 22 is in its depressed position as depicted in Fig. 2. In such position the relatively large outer diametered surface 24 is juxtaposed moving tape 30, which tape is pressed against surface 24 by idler wheel 40. It will be understood that capstan 22 revolves with shaft 12 because runners 20a, b resiliently bear against cam surface 29 with sufficient friction to cause said capstan to turn with shaft 12 in the direction of arrow 54 as tape moves in the direction of arrow 33. Idler wheel 40, in turn, revolves in the direction of arrow 55. The aforesaid direction of tape movement corresponds to record or playback operation wherein reel 32 is operationally interconnected with the recording machine motor to rotate slightly faster than flywheel 10. However, the driving interconnection between reels 31, 32 and the motor is subject to slippage so that the true speed of tape movement is effectively determined by the linear speed of capstan outer diameter 24 when moving tape 30 is pressed against said surface and by the linear speed of shaft outer diameter 12 when tape 30 is pressed against said surface. In other words, the aforesaid structural arrangement which effectively pulls tape 30 off reel 31 at a speed as determined by the linear speed of the driven moving surface against which tape is pressed, in one case, it being outer diameter surface 24, and the other case, it being shaft diameter 12. Inasmuch as the aforesaid surfaces of speed changing structure 16 determines the effective speed of tape movement, the surfaces are preferably machined uniformly at a predetermined diameter. The diameter selected and the speed of rotation of shaft 12 naturally will determine the speed of tape movement. The larger diametered surface 24 provides the higher speed. As tape 30 is pushed past the speed changing structure 16, tape 30 is pulled onto take up reel 32 which is turning at a faster speed by the motor, but subject to slippage. Slippage prevents tape 30 against tearing but allows tape 30 to wind up as a taut roll. Although not shown herein because it plays no part in the instant invention, it will be understood that for rewinding the tape from reel 32 to reel 31, reel 31 is then interconnected with motor so as to pull tape 30 back to it in a direction opposite arrow 33. In this instance, it may be convenient to pivot member 41 so as to withdraw idler 40 from its clamping position. On rewind, reel 31 continues to pull tape 30 even though member 41 may be pivoted to "non-clamping position."

Should it be desirable to change from high speed to low speed tape movement, one grips end 26 of capstan 22 so as to pull same upwardly in direction of the arrow shown in Fig. 3. Cam surface 29 facilitates raising of capstan 22 because the change from high to low speed may be effected without withdrawal of idler 40 from its clamping position. As capstan 22 is being raised, cam 29 gradually urges runners 20*a, b* outwardly until said runners engage undercut 19. It will be understood that the overriding inwardly force of spring 21 does not allow runners to escape outwardly from slot 27. Capstan 22 is raised until it occupies position shown in Fig. 3 wherein member 41, upon withdrawal of said capstan and under the force of spring 43, advances to cause idler 40 to press tape 30 against flywheel shaft 12.

When capstan 22 reaches its upper position, it is held thereat by the friction engagement of runners 20*a, b* against undercut surface 19 developed by inward force of the expanded spring 21. The diameter of inner bore 23 of capstan 22 is dimensioned to assure that capstan turns with shaft 12 and yet permits slidable displacement of capstan 22 along said shaft by reason of manual force.

Reverse speed change, that is, from low speed to high speed, requires depression of capstan 22 back to the position it occupies in Fig. 2. This may be done by pushing down on capstan end 26 by one's finger. However, in this instance, it is noted from Fig. 3 that idler 40 extends under the larger diametered section 24 of capstan 22. Therefore, the foregoing structure requires withdrawal of idler 40 to change from low speed to high speed by means of depressing a button 44 in direction of arrow 45. As noted hereinbefore, when member 41 is pivoted to withdraw idler 40 from its clamping position, reels 31, 32 are normally operatively disconnected from motor so as to halt tape movement. This, in a sense, is considered neutral position of the clutching action provided by member 41. When idler 40 is withdrawn from its clamping position, the resiliently bowed tape 30 springs away from under capstan 22 a sufficient distance to permit enlarged portion of capstan sleeve 22 to drop down without engaging or otherwise crushing tape 30. Capstan 22 is moved downwardly under the pressure of one's fingers until runners 20*a, b* engage lower shoulder stop 17 as shown in Fig. 2 and now button 44 is released so as to permit idler 40 to snap back into clamping position so as to press tape 30 against large diameter surface 24. When capstan 22 is brought down to its lower position, runners 20*a, b* initially might not engage cam surface 29. However, a slight amount of slippage will exist between the spring carrying capstan 22 and flywheel shaft 12 which will ultimately cause runners 20*a, b* to engage cam surface 29 and hold thereat as capstan 22 now turns with shaft 12.

In practicing the instant invention, it may be desirable to stop tape movement when converting from one speed to the other which may be carried out by moving member 41 in its neutral position. On the other hand, the motor turning need not be stopped when changing from one speed to the other. In using the aforesaid structure, it has been noted that reel movement need not be halted during a speed change from high to low speed although this may be a matter of choice. Moreover, it will be understood that the relatively simple method and structure depicted herein for pivoting member 41 and two-arm lever 47 is shown merely for illustrative purposes and that in actual practice a more elegant arrangement may be employed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Capstan apparatus for changing the speed of movable recording tape for magnetic sound recording and reproducing apparatus wherein the moving tape is operatively clamped between said capstan and a roller idler comprising, drive means having an upright turnable shaft, said shaft having a predetermined outside diameter and also having opposed spaced apart shoulder stops defined by an axial segment of shaft having an undercut outside diameter intermediate said shoulder stops, a longitudinal capstan sleeve having a cylindrical inner bore extending from one open end of said sleeve, said sleeve being mounted on said shaft, said capstan having an axial section thereof of predetermined outside diameter larger than the aforesaid shaft outside diameter, said capstan also having an opening extending through a section of its wall, means in locked register with said opening and extending therethrough and having an inner end adapted to engage slidably said undercut outside diameter of said shaft, magnetic tape speed being alternated from a relatively high to a relatively low speed by alternating the position of said capstan with respect to said shaft from one to another of two positions, vertical displacement of said capstan from one to another of its two positions being limited by engagement of said means with respectively said lower and upper shoulder stops wherein depression of said capstan to a first of its positions causes said means to engage said lower shoulder stop and thus disposes said relatively large capstan outside diameter juxtaposed said movable tape, whereby said tape is clamped against said relatively large capstan outside diameter by said idler roller so as to effect tape movement at a predetermined high speed, translation of said capstan to the other of its positions withdraws said capstan from its position juxtaposed said tape wherein said tape is now clamped against said shaft outside diameter by said idler, whereby the speed of said tape is operatively reduced to said lower speed, and means for withdrawing said idler wheel so as to allow said tape and wheel to assume a position spaced from said shaft wherein clearance is now provided to allow depression of said capstan to return its outside diameter juxtaposed said tape in order to effect again high speed operation.

2. Apparatus as defined in claim 1, wherein, said locked means includes a resilient circular ring having inwardly turned and spaced apart ends projecting through said opening, said ends serving as runners adapted to engage slidably said undercut outside diameter, said ring being resiliently snapped on said capstan to effect sufficient pressure and friction so that engagement of said runners with said undercut outside diameter holds said capstan in its second position until depressed by an external force.

3. Apparatus as defined in claim 1, wherein, said shaft having a further undercut portion adjacent its lower shoulder stop wherein said further undercut portion gradually inclines to register with the first undercut portion thereby forming a cam face, and wherein, said lock means includes a resilient circular ring having inwardly turned and spaced apart ends projecting through said opening, said ends serving as runners adapted to engage slidably said undercut outside diameter and cam face, said ring being resiliently snapped on said capstan to effect pressure and friction such that engagement of said runners with said undercut diameter and cam face is characterized by slippage but is sufficient to hold said capstan at its upper position until depressed by an external force, said runners being adapted to engage said cam face upon said capstan occupying its lower position, said cam surface facilitating vertical translation of said capstan toward its upper position upon being pulled by a person while the movable tape is being clamped between said capstan and idler wheel so as to avoid the necessity of halting tape movement upon converting tape movement from relatively high speed to low speed.

4. Capstan apparatus for changing the speed of movable recording tape for magnetic sound recording and reproducing apparatus wherein the moving tape is operatively clamped between said capstan and a roller idler comprising, drive means including a flywheel mounted for turning with an upright shaft, said shaft having a predetermined outside diameter and also having opposed spaced apart shoulder stops defined by an axial segment of shaft having an undercut outside diameter intermediate said shoulder stops, said flywheel being rated for turning at substantially one specified speed, a longitudinal capstan sleeve having a cylindrical inner bore extending from one open end of said sleeve, said sleeve being mounted over the top of said shaft, said capstan having an axial section thereof of predetermined outside diameter larger than the aforesaid shaft outside diameter, said capstan also having an opening extending through a section of its wall, means in locked register with said opening and extending therethrough and having an inner end adapted to engage slidably said undercut outside diameter of said shaft, magnetic tape speed being alternated from a relatively high to a relatively low speed by alternating the position of said capstan with respect to said shaft from one to another of two positions, vertical displacement of said capstan from one to another of its two positions being limited by engagement of said means with respectively said lower and upper shoulder stops wherein depression of said capstan to a first of its positions causes said means to engage said lower shoulder stop and thus disposes said relatively large capstan outside diameter juxtaposed said movable tape, whereby said tape is clamped against said relatively large capstan outside diameter by said idler roller so as to effect tape movement at a predetermined high speed, translation of said capstan to the other of its positions withdraws said capstan from its position juxtaposed said tape wherein said tape is now clamped against said shaft outside diameter by said idler, whereby the speed of said tape is operatively reduced to said lower speed and means for withdrawing said idler wheel so as to allow said tape and wheel to assume a position spaced from said shaft wherein clearance is now provided to allow depression of said capstan to return its outside diameter juxtaposed said tape in order to effect again high speed operation.

5. Capstan apparatus for changing the speed of movable recording tape for magnetic sound recording and reproducing apparatus wherein the moving tape is operatively clamped between said capstan and a roller idler comprising, drive means having an upright turnable shaft, said shaft having a predetermined outside diameter and also having opposed spaced apart shoulder stops defined by an axial segment of shaft having an undercut outside diameter intermediate said shoulder stops, a longitudinal capstan sleeve having a cylindrical inner bore extending from one open end of said sleeve, said sleeve being mounted on said shaft, said capstan having an axial section thereof of predetermined outside diameter different than the aforesaid shaft outside diameter, said capstan also having an opening extending through a section of its wall, and means in locked register with said opening and extending therethrough and having an inner end adapted to engage slidably said undercut outside diameter of said shaft, magnetic tape speed being alternated from a relatively high to a relatively low speed by alternating the position of said capstan with respect to said shaft from one to another of two positions, vertical displacement of said capstan from one to another of its two positions being limited by engagement of said means with respectively said lower and upper shoulder stops wherein positioning of said capstan to a first of its positions causes said means to engage one of said shoulder stops and thus disposes said capstan outside diameter juxtaposed said movable tape, whereby said tape is clamped against said capstan by said idler roller so as to effect tape movement of a predetermined speed, translation of said capstan to the other of its positions withdraws said capstan from its position juxtaposed said tape wherein said tape is now clamped against said shaft outside diameter by said idler, whereby the speed of said tape is operatively changed to another predetermined speed.

6. Apparatus as defined in claim 5 further including means for withdrawing said idler wheel so as to allow said tape and wheel to assume a position spaced from said shaft wherein clearance is now provided to allow movement of said capstan from its second position to its first position so as to return said capstan outside diameter juxtaposed said tape in order to effect again the first predetermined operational speed.

7. Apparatus as defined in claim 5, wherein, said shaft having a further undercut portion adjacent its lower shoulder stop, said further undercut portion gradually inclining to register with the first undercut portion thereby forming a cam face, and wherein, said lock means includes a resilient circular ring having inwardly turned and spaced apart ends projecting through said opening, said ends serving as runners adapted to engage slidably said undercut outside diameter and cam face, said ring being resiliently snapped on said capstan to effect pressure and friction such that engagement of said runners with said undercut diameter and cam face is characterized by slippage but is sufficient to hold said capstan in its second-mentioned position until moved to its first-mentioned position by an external force, said runners being adapted to engage said cam face upon said capstan occupying its first-mentioned position, said cam face facilitating movement of said capstan away from said first-mentioned position wherein said runners are cammed out by the inclined surface of said cam face and ultimately engage said first undercut portion as said capstan travels towards its second position.

No references cited.